Feb. 17, 1959 J. R. ARNI 2,874,018
SPEED RECORDERS
Filed Aug. 24, 1955 2 Sheets-Sheet 1
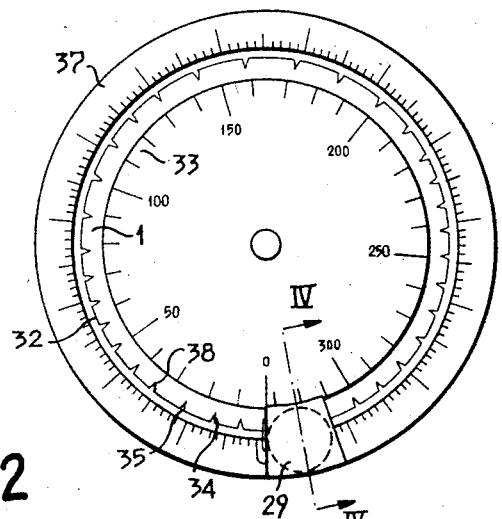
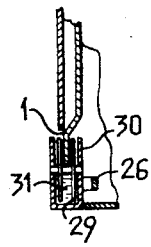
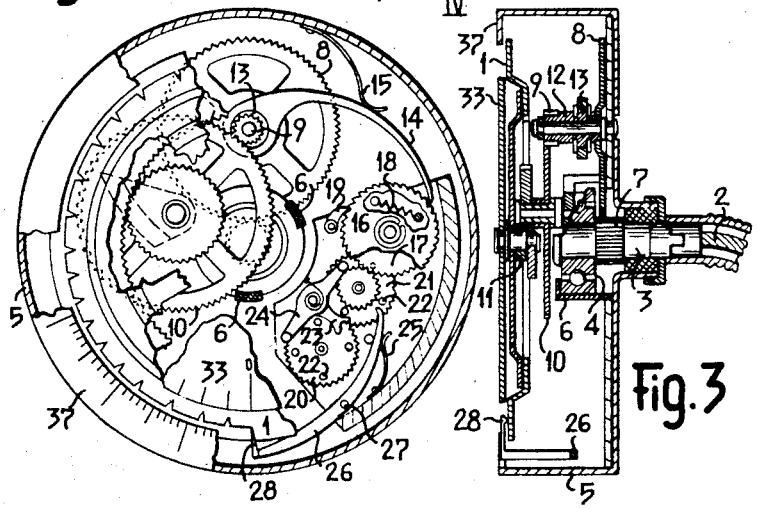
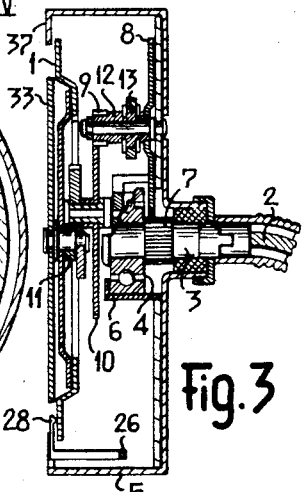
INVENTOR
Johann R. Arni.
BY
ATTORNEY Feb. 17, 1959 J. R. ARNI 2,874,018
SPEED RECORDERS
Filed Aug. 24, 1955 2 Sheets-Sheet 2

INVENTOR
Johann R. Arni.

BY

ATTORNEY

United States Patent Office 2,874,018
Patented Feb. 17, 1959

2,874,018

SPEED RECORDERS

Johann R. Arni, Geneva, Switzerland, assignor, by mesne assignments, to Anstalt Merces, Vaduz, Liechtenstein, a corporation of Liechtenstein Application August 24, 1955, Serial No. 530,225

Claims priority, application Switzerland September 2, 1954

10 Claims. (Cl. 346—18)

The present invention has for its subject an apparatus for recording speed, particularly for a vehicle, comprising a mechanism for driving a disc in rotation in proportion to the movement effected by the object of which it is desired to record the speed and a device for making marks on said disc at regular time intervals.

Apparatus of this character is already known wherein the marks are made magnetically on a disc coated with a ferro-magnetic powder. These apparatuses, however, have a great disadvantage, as when it is desired to establish the speed of the vehicle, for example after a collision, it is necessary to place the said disc in another apparatus indicating the speed of the vehicle as a function of the positioning of the said marks. Another possibility consists in making visible time marks, for example on paper, from which it is possible to determine the speed of a vehicle by calculation as it is possible to measure the distance travelled during a determined period of time. However, the calculation requires a predetermined period of time and frequently gives rise to errors.

Other apparatuses are also known, according to which the speed is inscribed directly on a disc which rotate in proportion to the distance travelled. The disc is usually formed by a sheet of translucent fabric or paper located opposite a rigid disc coated with a layer of tinted adhesive wax. When the sheet is pressed against the layer of wax, the adhesion of the latter produces a visible mark on the translucent sheet, which mark may be removed when again separating the said sheet from the layer of adhesive wax, for example when separating the latter by means of a thread placed between the sheet and the disc. These apparatuses, however, are expensive as they must comprise a tachymeter. Further, the layer of wax dries a predetermined period of time, so that the trace left on the translucent sheet becomes less and less visible.

The apparatus forming the subject of the invention tends to eliminate the above-mentioned disadvantage and is of very simple construction. It is characterised in that it comprises two graduations opposite which the said disc moves, one of the said graduations indicating the path travelled by the said object, the other graduation being provided with divisions, the distance between these divisions being such that the average speed of the object between two successive time marks may be read directly by counting the number of divisions comprised with reference to these two time marks.

One form of construction and modifications of construction of the subject of the invention, applied to a speedometer of an automobile vehicle, are shown diagrammatically and by way of example in the accompanying drawings, wherein:

Fig. 1 is a front view of the apparatus.

Fig. 2 is a similar view, parts being broken away so as to show the mechanism.

Fig. 3 is a cross-section of the apparatus shown in Fig. 2.

Fig. 4 is a partial section on the line IV—IV of Fig. 1.

Figure 5:
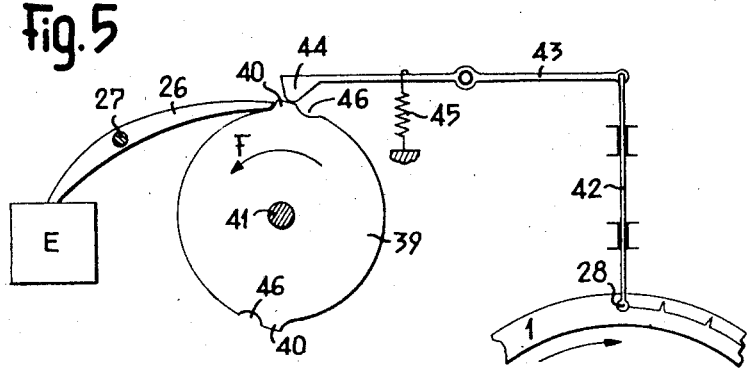
Figs. 5 and 6 show diagrammatically mechanical and electrical relays for a device adapted to record the time marks.

The instrument shown in Figs. 1 to 3, comprises a disc 1 driven in rotation in proportion to the distance travelled by the vehicle through the medium of a flexible cable 2 (Fig. 3). Said cable 2 is connected to an input shaft 3 rotatable in a ball bearing 4 of which the outer ring is secured to an outer housing or casing 5 of the apparatus by lugs 6. The shaft 3 has teeth 7 gearing with the gear train 8, 9, 10, 11 for ensuring the drive of the disc 1. The ratio of demultiplication between the shaft 3 and the disc 1 is so selected that the latter makes three revolutions per kilometer travelled by the vehicle. The peripheral recording area of the disc 1 is exposed through a window resulting from the spacing between the concentric distance scale 33 and the speed scale 37.

The gears 8 and 9 are secured to a sleeve 12 carrying an eccentric part 13 to which is hinged a pawl 14. The latter is subjected to the action of a spring 15 and co-operates at its end with a ratchet wheel 16 of a time mechanism or clockwork. Said wheel 16 forms a spring motor with a wheel 17 to which it is connected by a coiled spring 18 operating under traction and of which the two ends are connected respectively to each of the two wheels at a point near their periphery. A pawl 19 is provided to prevent the wheel 16 from turning under the action of the spring 18. The wheel 17 has teeth by which it drives an escapement device formed by two wheels 20 and 21 each carrying four pins 22 distributed on their periphery, for co-operating with the part 23 of an escapement 24. The pins 22 of the wheel 21 are adapted to rock, at regular intervals of time and against the action of a spring 25, stylus means including a stylus lever 26 hinged at 27 and of which the end carries a stylus point 28 adapted to trace the time marks on the disc 1. The escapement is provided to carry out 18,000 oscillations per hour, so that the lever 26 rocks at time intervals of 0.4 second.

The number of movements carried out by the spring motor winding pawl 14 is proportional to the distance travelled by the vehicle, whilst the rotation of the wheel 17 depends linearly on the time. It is thus necessary that the movement of the pawl 14 is sufficient to ensure the operation of the escapement from a predetermined speed of the vehicle, for example from 20 km. per hour. It thus follows that, when the vehicle travels at a higher speed, the spring motor is rewound completely and that a device should be provided to avoid any dangerous overtensioning of the spring. For this purpose, a stop, not shown, is provided between the wheels 16 and 17 and the pawl 14 is sufficiently flexible so as to enable it to flex without driving the ratchet wheel 16, when the motor is rewound completely.

As shown in Fig. 4, the disc 1 passes between two flanges of a coating roller 29, said flanges dipping into a reservoir 30 containing a viscous ink 31. Said latter may, for example, be formed by grease containing graphite. The movement of rotation of the disc 1 drives by friction the roller 29 which thus deposits a layer of grease on the edge of the disc as a recording medium. The tracing point 28 is for the purpose of removing a portion of said grease in such a manner that a graph or recording impression 32 is formed. Preferably, the disc may be of polished metal, when grease containing graphite is used as a tinted material in such a manner that the impression 32 is well visible.

With reference to Fig. 1, the disc 1 is driven in rotation in a clockwise direction and the peripheral area having the recording medium thereon moves opposite a dial 33, which is stationary relatively to the casing 5 and is provided with distance graduations as shown. Said dial is graduated from 0 to 300 m. and the tracer point 28 is located opposite the graduation 0. On said graduation it is possible to read the distance travelled by the vehicle between two successive offset time marks 34 and 35 and thus ascertain the speed of the vehicle at this moment. However, it is more convenient to be able to read directly the speed of the vehicle. For this purpose, the apparatus is also provided with a speed scale 37 which is stationary relatively to the apparatus. Said graduation has divisions separated by such a distance that the average speed of the object between two successive time marks, for example 34 and 35, may be read directly by counting the number of divisions comprised relatively to said two marks.

In Fig. 1, four divisions are provided between the time marks 34 and 35, so that, in the case in which these divisions correspond with 20 km./per hour, there is implied a speed of the vehicle of 80 km./per hour. In order to allow of greater precision of the measurement, it is advantageous to double the distance between the time marks and to count the number of divisions of the graduation 37 comprised, for example, between the marks 34 and 38. In this case, the mark 35 is ignored and it is possible to count eight and a half divisions between the marks 34 and 38, which indicates a speed of 85 km./per hour, the distance between two successive divisions corresponding naturally to a speed twice less, that is to say 10 km./per hour. The graduation 35 indicates the path travelled by the vehicle and it is possible to observe that the speed of 85 km./per hour referred to, has been reached over a distance extending from 35 to 15 m. in advance of the point at which the vehicle is located at the moment at which the disc 1 occupies the position shown in Fig. 1. It will be seen that it is thus possible to ascertain the speed of the vehicle over the last 300 meters through which it travelled before it was stopped voluntarily or involuntarily. In fact the roller 29 covers a portion of the disc over a distance corresponding substantially to the last 33 meters of the graduation 33.

It will be understood that the values indicated for the graduation of the distance may be selected at will by a suitable selection of the ratio of the gear train 7 to 11 and that the period of beat of the escapement device may be of value. The division 37 should be established whilst taking into consideration these two parameters. In the form of construction described an escapement has been selected which makes 18,000 oscillations per hour so that successive marks on the disc correspond to a spacing of 0.4 second. If it is desired that the graduation 37 should have ten divisions which correspond to a speed of 100 km./per hour for the vehicle, whilst the reading is made over a space of time twice that indicated by the tracing point 28, for example as indicated above, between the marks 34 and 38, it will be seen that this duration is of 0.8 second. At 100 km./per hour the vehicle travels 27.77 m. per second, that is to say 22.22 m. in 0.8 second. It thus results that the ten divisions of the scale 37 should be opposite a distance of 22.22 m. of the graduation 33. As the latter extends over a third of a kilometer, the number of divisions which the graduation 37 should have over its entire length, that is to say a complete revolution, is equal to 333.33 m. divided by 22.22 and multiplied by 10, that is to say 150 divisions.

If it is desired the speed to be indicated in miles per hour and the length in yards, it is obviously possible to modify the granduation distance scale 33 and speed scale 37. In this case, the same escapement device may be used and for example, the graduation 33 may correspond to a length of 352 yards the graduation 37 having then 90 divisions. Each of these divisions would correspond to 10 miles per hour when reading the speed over a space of time twice that indicated by the tracing point 28, that is for a duration of 0.8 second.

In a modification, it is advantageous to provide the graduation 37 on a disc capable of being moved relatively to the casing of the apparatus, so as to enable a division of this graduation to be placed exactly opposite the time mark, from which it is desired to determine the speed of the vehicle at a predetermined point of the last 300 meters which it has traveled.

Preferably, the graphite-grease contained in the reservoir 30 is a grease with a silicon base which has the property of retaining a practically constant viscosity in spite of differences in temperature.

It will be understood that it is possible to use other materials, and in the case when a very viscous ink is used, it is possible that the escapement device is not sufficiently powerful to produce the movement of the tracing point. It is then possible to use a relay device such as that shown in Fig. 5. Said relay is of the mechanical type and the lever 26 actuated by the escapement prevents rotation of a wheel 39 by bearing at its end against one of two stops 40 provided at the periphery of said wheel. Said latter tends to be driven in the direction of the arrow F by the friction which it applies to its shaft 41 by a known friction device. When the lever 26 oscillates it allows the stop 40 to escape and the wheel 39 makes half a turn until the diametrically opposite stop meets the end of the lever. The tracing point 28 is secured to the end of an arm 42 controlled by a lever 43 of which one end 44 is held against the edge of the wheel 39, which forms a cam, by a spring 45. It will be seen that at each movement of the lever 26, the wheel 39 makes half a revolution, and in passing into the notch 46 located just behind the stop 40 the end 44 of the lever 43 moves the point 28 in synchronism with the beats of the escapement device E.

Figure 6:
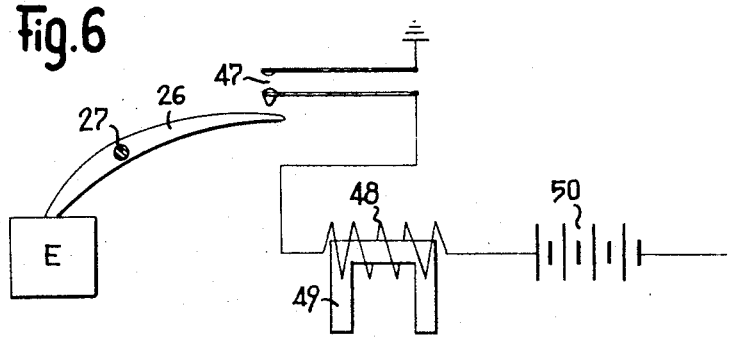

Fig. 6 shows another possibility for reducing the work to be supplied by the escapement device E. The lever 26 is capable of closing a contact 47 in such a manner as to cause the current to pass through a winding 48 of an electromagnet 49, said current being supplied by a battery 50. The electromagnet 49 attracts, against the action of a spring 51, an armature 52 of which the end carries the tracing point 28.

Figure 7:
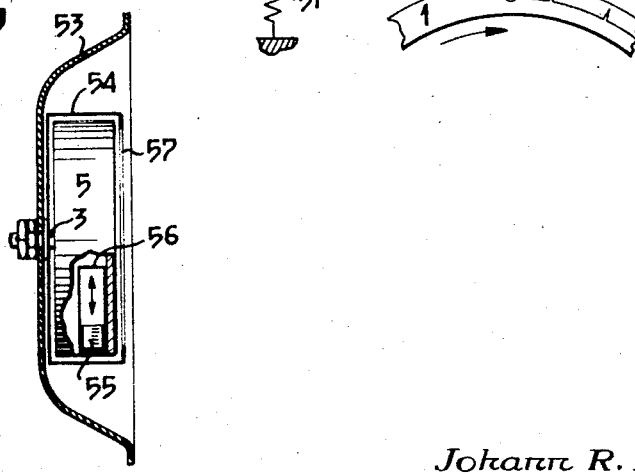
Fig. 7 is a view, partly in section, of an apparatus secured to a wheel of a vehicle.

It is known that the installation of a drive by a metal cable 2, as provided in the form of construction described, is an operation which it is very difficult to carry out on a vehicle. Fig. 7 shows a modified form of construction of the apparatus described, according to which the said apparatus can be secured to a cap 53 of a wheel of a motor vehicle, not shown. The shaft 3 shown in Fig. 3 is no longer connected to a metal cable 2, but has a screwed part enabling it to be secured directly to the cap 53 in such a manner that its longitudinal axis is located along an extension of the axis of rotation of the wheel. The casing 5 shown in Fig. 3 is enclosed in a new casing 54 secured to the input shaft 3. The lateral face 57 of the casing 5 is formed by a plate of transparent material enabling the disc and the graduations to be seen. In the interior of the casing 5 is located a mass 55 adapted to form a load for the purpose of preventing the apparatus from turning at the same time as the wheel. It will be seen that, when the vehicle is travelling, the input shaft 3 is driven in rotation at the same time as the vehicle wheel, whilst the casing 5 is immovable by reason of the mass 55, so that the operation and the interior of the apparatus are identical with the above described form of construction. It will be understood that the ratio of the gears 7 to 11 should be selected whilst taking into consideration the diameter of the tyre. It will be observed that the mass 55 is located in a cylinder 56 in the interior of which it can move freely. Its natural weight meanwhile holds in the position shown in Fig. 7, but when the wheel of the vehicle passes suddenly into a depression in the road, the acceleration to which it is subjected may be very much greater than the terrestrial acceleration so that the mass 55 lodges in the upper end of the cylinder 56.

The distribution of the masses of the apparatus is so provided that when the mass 55 is in this latter position, the centre of gravity of the apparatus is located on the geometrical axis of the shaft 3. Thus, when the wheel passes suddenly into a hollow, there is avoided the tendency of it causing the apparatus to turn so that the load produced by the mass 55 comes to lie above the shaft 3, which would naturally falsify the measurements. The acceleration to which the apparatus is subjected, when the wheel rises on a bump, has no unfavourable influence on the stability of the apparatus, as the force of the load is still increased at this moment.

In a modification, the speed graduation 37 may be combined with the distance graduation 33. In fact a vehicle travelling at 100 km./per hour travels 10 meters in 0.36 second. When an escapement device is provided which makes spaced marks of 0.36 second, it will be seen that two successive time marks are spaced 10 meters apart on the distance graduation enabling a speed of 100 km./per hour to be deduced. In this manner there is created a simple relationship between the distance separating two successive time marks and the average speed at which this distance has been travelled. If a division is made all the two meters on the distance graduation and there is effected the measurement of the average speed by counting the number of divisions comprised between the extreme marks of two intervals of time, as, for example, 34 and 38 in Fig. 1, it will be seen that these divisions of two meters represent at the same time a speed of 10 km./per hour.

When graduating the apparatus in miles and yards, a division could be made every 2.5 yards. A vehicle travelling at 50 miles per hour travels 12.5 yards in 0.51 second. When an escapement device is provided which makes spaced marks of 0.51 second two successive time marks are spaced 12.5 yards at a speed of 50 miles per hour and as 12.5 yards are represented by five divisions of 2.5 yards, it is obvious that one division represents at the same time a speed of 10 miles per hour.

I claim:

1. An apparatus for recording vehicular speed, comprising, a disc rotatably driven in proportion to the movement of the vehicle whose speed is to be recorded, means for producing time marks on the peripheral face of said disc at regular intervals of time, a pair of stationary scales supported in opposite co-planar spaced relation to visually expose the marks on the peripheral face of said disc, one of said scales indicating the distance traversed by the vehicle and the other of said scales having speed indicating divisions, the distance between said speed divisions being such that the average speed of the vehicle between any two successive time marks on the disc can be read directly by counting the number of divisions on the speed scale between said time marks.

2. An apparatus for recording vehicular speed, comprising, a recording disc rotatably driven proportionately to the speed of the vehicle, stylus means for making marks on said recording disc at regular intervals of time, circular distance and speed scales supported in a stationary position concentrically with said disc and in fixed spaced relation to each other to visibly expose therebetween a portion of the recording disc so that said time marks remain visible for a predetermined distance of travel of the vehicle, whereby upon comparing the speed and distance scales with the time marks, the average speed of the vehicle between any two successive time marks can be read by counting the number of divisions comprised between said time marks.

3. An apparatus for recording vehicular speed, comprising, a pair of annular concentric distance and speed scales supported in fixed relation to each other and marginally spaced to provide a window therebetween, a rotatable disc also concentric with said scales and having a peripheral area exposed through said window, said disc having a driving connection with the vehicle, stylus means for producing a line graph on the peripheral portion of the disc while the vehicle is in motion, and time controlled means for actuating said stylus means to produce time marks offset from the line graph for comparison with the distance and speed scales.

4. An apparatus for recording vehicular speed, comprising, a pair of annular concentric distance and speed scales supported in fixed spaced relation to each other to provide a window therebetween, a rotatable disc also concentric with said scales and having a peripheral recording area exposed through said window, a vehicle driven shaft and gear train for rotating said disc, a stylus lever pivotally supported so that its stylus tip is in recording relation to said portion of the disc exposed through said window, and a clockwork mechanism for oscillating said stylus lever at regular intervals of time.

5. An apparatus for recording vehicular speed, comprising, a pair of annular concentric distance and speed scales supported in fixed spaced relation to each other to provide a window therebetween, a rotatable disc also concentric with said scales and having a peripheral recording area exposed through said window, a vehicle driven shaft and gear train for rotating said disc, a stylus lever pivotally supported so that its stylus tip is in recording relation to said portion of the disc exposed through said window, a clockwork mechanism for oscillating said stylus lever at regular intervals of time, a spring motor, an escapement driven by said motor for actuating said stylus lever, and a flexible pawl actuated by a portion of said gear train for automatically winding said spring motor.

6. An apparatus for recording vehicular speed, comprising, a pair of annular concentric distance and speed scales supported in fixed relation to each other and marginally spaced to provide a window therebetween, a disc concentric with said scales and having a peripheral recording area exposed through said window, means for coating the portion of said disc exposed through the window with a recording medium, a stylus lever having a stylus point for producing a graph line on said coating of the disc, clock-work for rocking said stylus lever at regular time intervals so that a stylus point will make successive time marks on the recording medium of the disc while the latter is being driven by the movement of the vehicle, said means including an escapement mechanism for engaging the end of the lever opposite the stylus point, a spring motor having gear train connections with the escapement mechanism, and means driven by the gear train for rotating the disc for winding said spring motor.

7. An apparatus for recording vehicular speed for a given time and distance, comprising, a housing, a pair of annular concentric scales supported in fixed co-planar relation on the housing and spaced to provide a window therebetween, one of said scales having distance marks thereon and the other of said scales having speed indicating marks thereon, said scales being disposed opposite each other and at either side of said window, a shaft concentric with the scales and having a gear train actuated by a moving part of the vehicle, a disc mounted on said shaft and having a portion exposed through said window and provided with a recording medium, and stylus means including a stylus pawl rockably mounted in said housing and having its stylus point disposed in tracing relation in said recording medium on the disc to produce a line graph, and time means for rocking said stylus lever at regular intervals of time to produce time marks offset from the line graph, whereby, the average speed of the vehicle between any two successive time marks can be read directly by counting the number of divisions of the speed scale between said two time marks.

8. An apparatus for recording vehicular speed according to claim 7, wherein the stylus means also includes a cam operated by said pawl, a pivoted lever having one end spring biased to follow the cam, and a guided rod connected to the other end of the lever and having a stylus point for tracing a graph on the recording medium.

9. An apparatus for recording vehicular speed according to claim 7, wherein, the stylus pawl operates a switch in a circuit including a magnet, an armature element spring biased away from the magnet, and a stylus point on the armature.

10. An apparatus for recording vehicular speed according to claim 7, wherein, the housing containing the scales and disc is weighted at the bottom and shielded by a cap carried by and rotating with the vehicle wheel while the shaft is an extension of the axis of the wheel.

References Cited in the file of this patent

UNITED STATES PATENTS

| | | |
|---|---|---|
| 920,487 | Murphy | May 4, 1909 |
| 1,487,516 | Heller | Mar. 18, 1924 |
| 1,681,460 | Bruhn | Aug. 21, 1928 |
| 1,693,701 | Merrick | Dec. 4, 1928 |